E. C. SENDELBACH.
VEHICLE WHEEL.
APPLICATION FILED DEC. 15, 1916.
1,231,304. Patented June 26, 1917.
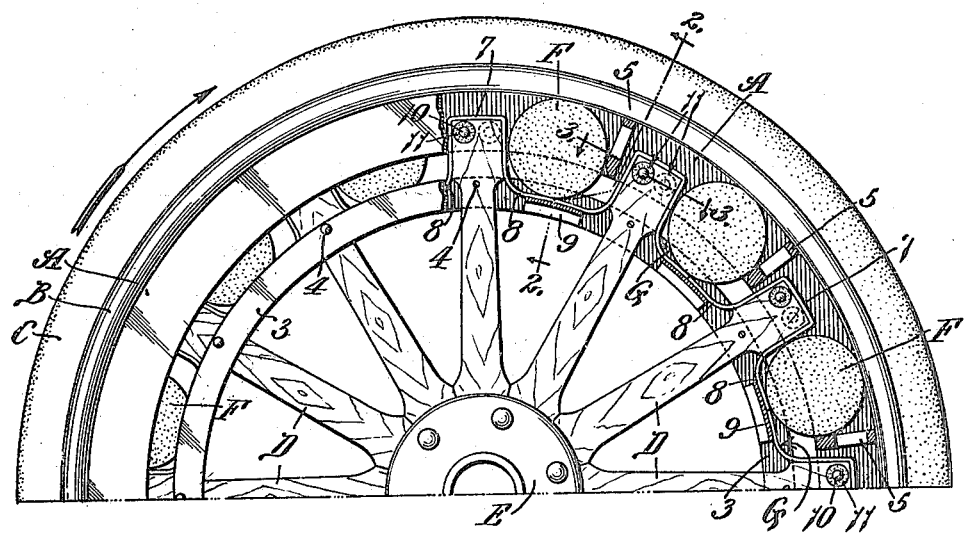
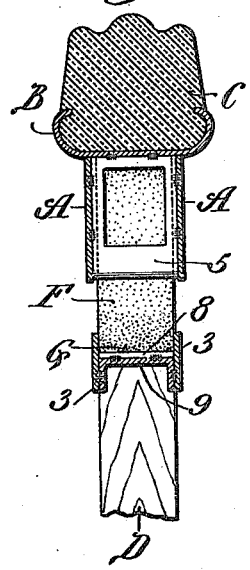
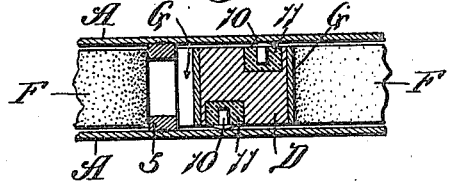
Inventor,
Edward C. Sendelbach.

UNITED STATES PATENT OFFICE.

EDWARD C. SENDELBACH, OF CINCINNATI, OHIO.

VEHICLE-WHEEL.

1,231,304.

Specification of Letters Patent. Patented June 26, 1917.

Application filed December 15, 1916. Serial No. 137,145.

*To all whom it may concern:*

Be it known that I, EDWARD C. SENDELBACH, a citizen of the United States, residing at Cincinnati, Ohio, have invented a certain new and useful Improvement in Vehicle-Wheels, of which the following is a full, clear, and exact description, such as will enable others skilled in the art to which it appertains to make and use the same.

This invention relates to vehicle wheels of the type that comprise a hub section, a rim section and resilient elements arranged between said sections for absorbing the shocks that the rim section receives when the wheel is in service.

The main object of my invention is to provide a wheel of the character referred to that is light in weight and composed of parts which are combined in such a manner that they will not rattle when the wheel is in service.

Figure 1 of the drawings is a side elevational view, partly broken away, of a portion of a vehicle wheel constructed in accordance with my invention.

Fig. 2 is a cross-sectional view of same, taken on the line 2—2 of Fig. 1; and

Fig. 3 is a sectional view, taken on the line 3—3 of Fig. 1.

In the form of my invention illustrated in Figs. 1, 2 and 3, the rim section or felly section of the wheel comprises a rim B of any suitable type equipped with a tire C, two side flanges A and partition members 5 interposed between said side flanges and connected to same and to the rim B preferably by spot welding, as shown in Fig. 2. The hub section of the wheel is composed of spokes D that are connected at their inner ends to a hub E, two side rings 3 arranged on opposite sides of the spokes D adjacent the outer ends of same and securely connected thereto by bolts or other suitable fastening devices 4, and pocket members G arranged at the outer ends of the spokes, between the spokes, for carrying the resilient elements of the wheel, the outer end portions of the spokes D projecting into the space between the side flanges A of the rim section, so as to hold the hub and rim sections of the wheel in vertical alinement with each other and transmit the lateral thrusts or side thrusts from one of said sections to the other.

The resilient elements of the wheel consist of a plurality of cylindrical-shaped members F, preferably disks of solid rubber, that are arranged between the hub and rim sections of the wheel in the pocket members G, which are enough longer than the diameter of the disks F to permit said disks to shift bodily slightly in a direction circumferential of the wheel and also permit the disks to assume an oval shape when they are subjected to pressure by the rim B of the rim section and the bottom walls of the pocket members G in the hub section when the rim section and hub section move relatively to each other in a vertical plane. The pocket members G are preferably supported by the ends of the spokes D and are securely connected to the side rings 3, and while said members can be formed in various ways without departing from the spirit of my invention, I prefer to form them from strips of metal, each strip being bent to form a cap portion 7 that extends over the end of one of the spokes, so as to protect it from abrasion by the rim B of the felly section, and two laterally-projecting portions 8, each of which forms one-half of the bottom wall of one of the pocket members. Said strips are securely connected together and also fastened to the side rings 3 by short pieces 9 of U iron or channel iron that are spot welded to said strips and to the side rings 3, as shown in Fig. 2, the side rings 3 being so arranged that they serve as side walls for the pocket members G, and thus effectively prevent the disks F from moving laterally out of their pockets.

By constructing the wheel in the manner just described the rim section will practically float on the rubber disks F carried by the hub section, which disks are mounted on the hub section in such a manner that they can move slightly circumferentially of the wheel relatively to both of the sections when the rim section is subjected to a sudden shock or jar, and thus effectively absorb the shocks. In other words, in a wheel of the construction above described, the rubber disks are not confined closely in housings carried by the rim section and connected to the hub section by bolts that pass through the centers of said disks, as has heretofore been the usual practice in vehicle wheels of this general type, but, on the contrary, the rubber disks are arranged loosely in relatively long pockets in the hub section which are open at one side so that the felly portion or rim B of the rim section will bear directly on the outer surfaces of the disks. The hub section and rim section have no direct connection with each other, and as the disks F are not connected directly either to the hub section or to the rim section, it is possible for all of said elements to move relatively to each other circumferentially of the wheel. The result is, that the full resiliency of the disks F is utilized in absorbing the shocks, owing to the fact that the pressure is applied to the outer surfaces of the disks and said disks are free to assume an oval shape. Furthermore, in such a structure the shocks are partially absorbed by the relative circumferential movement of the disks and the hub section and rim section.

When the wheel is used on the rear axle of a vehicle as a drive wheel, the driving thrust of the hub section is transmitted to the rim section through the disks F and the partition members 5 on the rim section which said disks engage when the wheel turns to the right, looking at Fig. 1. The resiliency of the disks absorbs the starting shock on the rim section gradually when the hub section starts to turn, and thereafter, when the wheel is traveling over the road, said disks effectively absorb the road shocks on the rim section, the disks being free to assume an oval position when the rim section and hub section move relatively to each other in a vertical plane.

In order to prevent the end portions of the spokes D from becoming chafed or worn by the constant sliding action of the spokes on the side flanges A of the felly section, and in order to prevent said parts from rattling, I have provided the spokes with wear studs or rivets 10 that are backed up by blocks 11 of rubber, as shown in Fig. 3, each spoke being provided in its opposite side faces with holes in which said blocks of rubber are arranged, and the shanks of the rivets being arranged in holes in said blocks, so that the heads of the rivets will bear against the side flanges A. This is a very important feature of my wheel which adds greatly to its commercial utility, for the studs 10 and blocks of rubber 11 effectively prevent rattling; they eliminate wear on the side faces of the portions of the spokes that are housed in the felly section of the wheel; they will not wear out quickly and when they do become worn, they can be replaced easily.

A vehicle wheel of the construction above described is exceptionally strong and rugged; it is light in weight and it is inexpensive to manufacture. Furthermore, it absorbs the shocks more effectively than wheels of this general type that have heretofore been used, and it presents a neat and ornamental appearance.

Having thus described my invention, what I claim, and desire to secure by Letters Patent, is:

A vehicle wheel, comprising a rim section provided with side flanges, a hub section provided with spokes whose end portions fit between said side flanges, recesses in the side faces of said spokes, blocks of rubber in said recesses, and wear studs in said blocks of rubber that bear against said side flanges.

EDWARD C. SENDELBACH.

Copies of this patent may be obtained for five cents each, by addressing the "Commissioner of Patents, Washington, D. C."